March 23, 1965 F. ULRICH 3,175,102
PULSE-STORAGE DEVICES WITH AUTOMATIC SERIES READ-OUT
Filed Nov. 1, 1962
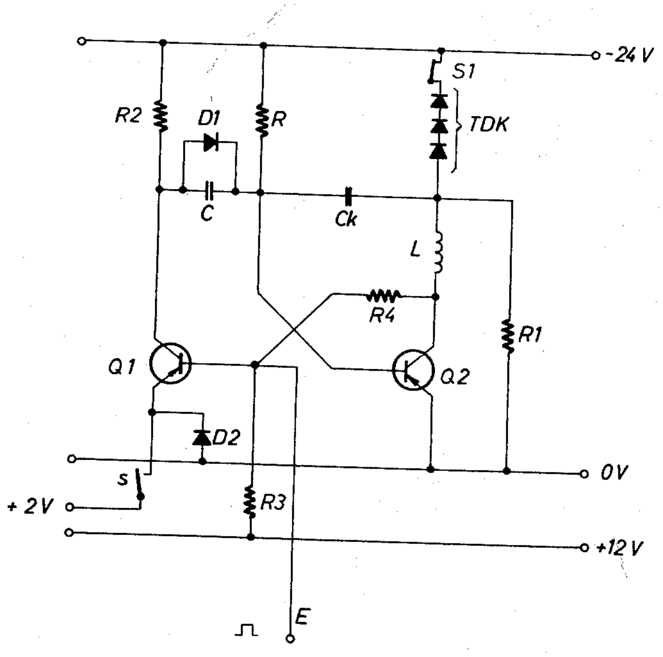
INVENTOR
F. ULRICH
BY Philip A. Weiss
Atty.

3,175,102

PULSE-STORAGE DEVICES WITH AUTOMATIC SERIES READ-OUT

Friedrich Ulrich, Stuttgart-Bad Cannstatt, Germany, assignor to International Standard Electric Corporation, New York, N.Y., a corporation of Delaware Filed Nov. 1, 1962, Ser. No. 234,806
Claims priority, application Germany, Nov. 8, 1961, St. 18,533
8 Claims. (Cl. 307—88.5)

The present invention relates to electronic storage devices and more particularly, to multistable storage devices with automatic series read-out.

Various types of multistable storage devices are already known which are composed of transistor chain circuits. These storage devices, however, are relatively expensive and complicated especially those switching means which are necessary for effecting the read-out of the stored information. Similar problems are encountered when using multistable storage devices comprising ferrite cores as storage elements.

Accordingly, it is an object of this invention to provide a new and unique multistable storage device that is economical and relatively uncomplicated.

A further object of the present invention is to provide a multistable storage device which is capable of simple reading.

In accordance with this invention, there is provided a very simple type of multistable storage device; in which, tunnel diodes with different peak currents are used as storage elements. Since the tunnel diode, within a certain range of current, and under equal current-flow conditions, is capable of assuming two different resistance values, it is capable of being used as a binary storage element. A group of tunnel diodes, all connected in series, are connected to a flip-flop circuit so that the pulse to be stored will intiate the flow of current passing over the chain of tunnel diodes. As soon as the current exceeds the value of the peak current of a tunnel diode which is still in the state of a small voltage drop, that tunnel diode suddenly changes its state. Consequently, an increased voltage drop appears at the tunnel diode. This voltage change is utilized for resetting the flip-flop circuit. Accordingly, every stored pulse can be read-out each time one tunnel diode changes into the state of the high voltage drop. In order to maintain the stored condition, a biasing current is always impressed upon the tunnel diodes, which is greater than the greatest valley current, and smaller than the smallest peak current of all tunnel diodes arranged in the chain.

The multistable storage device of the invention is characterized by the fact that there is used, as a storage element, a series connection of tunnel diodes having differrent peak currents. The series connected diodes are controlled via a flip-flop circuit. For the purpose of effecting the read-out of the stored information, the flip-flop circuit is converted into a monostable or one-shot circuit, and the said one-shot circuit because of the voltage differentials applied to the chain of tunnel diodes, is always again triggered until the tunnel diode chain has reached its final state wherein all of the tunnel diodes are in the high voltage drop state.

The automatic read-out of the stored information is accomplished in this way in combination with a simple switch-over. The pulses, as transmitted upon read-out from the one-shot circuit, correspond to the complement of the number of stored pulses.

All tunnel diodes, at the beginning of the write-in operation are brought into a state of small voltage drop, and the flip-flop circuit is reset to its initial state. In its initial state, the output of the flip-flop circuit is not current conducting. A special circuit is used to impress the bias current upon the tunnel diodes. This bias current is greater than the greatest valley current, and smaller than the smallest peak current of all tunnel diodes arranged in the chain. The use of this bias current guarantees that the circuit condition of the tunnel diodes will be maintained independently of the state of the flip-flop circuit. The pulses to be stored-in (or written-in) reverse the flip-flop circuit and effect the initiation of increased current flow over the chain of tunnel diodes. When the peak current of a tunnel diode which is still in the state of the small voltage drop is exceeded, a voltage differential appears at the chain of tunnel diodes. Via a coupling capacitor, this voltage change is coupled into the control circuit of the flip-flop arrangement to cause it to reset. The current rise at the output of the flip-flop circuit and, consequently, via the chain of tunnel diodes, is appropriately flattened with the aid of an inductance. To accomplish the read-out, the flip-flop circuit is switched over so that the one-shot circuit assumes the non-triggered condition with transistor Q2 conducting and, initiates an increased current flow via the chain of tunnel diodes. When the peak current of a tunnel diode which is still in the state of the small voltage drop, is exceeded the voltage change will again appear at the chain of tunnel diodes. This voltage differential is utilized for triggering the one-shot circuit by blocking transistor Q2. The one-shot circuit transmits a pulse upon each trigger action. The automatic resetting of the one-shot arrangement is delayed via the timing circuit of the one-shot arrangement. As soon as the one-shot arrangement returns to normal the current passing through the chain of tunnel diodes, via transistor Q2, is switched-on. As long as one tunnel diode is still in a state of small voltage drop, the triggering of the one-shot circuit by the voltage change occurs. The one-shot circuit will remain in its normal condition only if the chain of tunnel diodes has reached the final state in which all of the tunnel diodes have a high voltage drop. This condition is eliminated by opening the series tunnel diode circuit before a new write-in takes place.

The invention will now be explained in detail with reference to the preferred embodiment of the multistable storage device shown in the accompanying drawing.

In the write-in condition, that is with the contact *s* closed, the transistors Q1 and Q2 and associated components form a flip-flop circuit. The closing of the contact *s* causes the emitter potential of the transistor Q1 to be raised a slight extent (+2 volts). The base bias is controlled by the voltage drop across resistor R3 in the circuit comprised of resistors R3, R4 and transistor Q2. In the unblocked or conducting condition of the transistor Q1 the collector of transistor Q1 maintains a positive potential because of the voltage drop across load resistor R2. In view of the fact that the capacitor C is bridged or by-passed by the diode D1, the base electrode of the transistor Q2 is prevented from assuming negative potential in the unblocked condition of transistor Q1. Therefore, this condition of the circuit tends to be stable.

Switching means, such as switch S1, are provided to temporarily switch the chain of tunnel diodes off prior to a write-in process, so that in this initial condition all of the tunnel diodes have a small voltage drop. The necessary bias current is impressed through the resistor R1. The positive pulses, which are to be stored, arrive via the input E, and cause a reversal of the flip-flop circuit. The base electrode of Q1 becomes positive, so that the transistor Q1 is blocked. On account of this, the base electrode of the transistor Q2 becomes negative, and the transistor Q2 conducts. Thus, the flip-flop circuit assumes its second stable state. The current passing over the chain of tunnel diodes TDK increases. The rate of current rise is diminished with the aid of an inductance L which is inserted into this circuit. As soon as the current in the output circuit exceeds the value of the peak current of one tunnel diode, this tunnel diode is suddenly changed over into a state of high voltage drop. The voltage pulse thus produced, is coupled back to the base electrode of transistor Q2 via the coupling capacitor C*k*, in such a way that this transistor is blocked. The flip-flop circuit returns to normal or first stable state (transistor Q1 unblocked). Thus, one tunnel diode passes into a state of high voltage drop with every incoming pulse. The bias current is impressed upon the chain of tunnel diodes via resistor R1 to prevent a change of tunnel diode circuit condition subsequent to the return to normal.

Means are provided for changing the bistable multivibrator to a monostable multivibrator. This may be done with a mechanical switch, electromechanical relay or electronic switching means. As shown in this particular embodiment the contact *s* is opened to initiate the interrogation of the stored information. In this way, the flip-flop circuit is changed into a one-shot circuit. This one-shot circuit immediately proceeds to the initial position, with the transistor Q2 operated to conduct via the resistor R. This causes the current to be increased again via the tunnel diodes TDK. In cases where the current exceeds the value of the peak current of a tunnel diode which is still in the state of the small voltage drop, there is again produced the aforementioned voltage differential which appears at the output of transistor Q2, for example, across resistor R1. The one-shot circuit is now triggered via the coupling capacitor C*k*, causing the transistor Q1 to conduct and transistor Q2 to block. As long as the transistor Q2 conducts, the capacitor C remains charged. Subsequently to the triggering of the one-shot circuit to block transistor Q2, the capacitor C starts to discharge across the resistor R. Accordingly, the operating time of the one-shot circuit is determined by the timing circuit consisting of the resistor R and of the capacitor C. If this discharge process has proceeded far enough, the transistor Q2 will again become unblocked, and the transistor Q1 blocked. In other words, the one-shot circuit is returned to normal, to its one stable condition. The increased current through the chain of tunnel diodes is switched on again. The triggering of the one-shot circuit is automatically repeated until all of the tunnel diodes are in the state of the high voltage drop. In cases where $n$ tunnel diodes are arranged in the chain, it is possible to store up to $n$ pulses. However, if only $i$ pulses are stored then, upon interrogating the stored information value $(n-i)$ pulses are produced by the one-shot circuit. In this way, an output signal is obtained which comprises a number of pulses corresponding to the complement of the number of stored pulses up to the maximum possible number of $n$ pulses capable of being stored.

The given example of a preferred embodiment may still be modified, for example during the read-out, the pulse input E may be disconnected in order to prevent disturbances of the read-out processes which may be caused by any newly arriving pulses.

Other ways of designing flip-flop circuits and other ways of converting the circuit arrangement into a one-shot circuit are possible. All of these varieties, however, are based on the basic idea of automatically initiating the read-out by converting the flip-flop circuit to a one-shot circuit.

In cases where the pulses to be stored do not meet the requirements of the multistable storage device with respect to both polarity and pulse period of a suitable conversion circuit arranged at the pulse input E may be used. In this respect, it is worth mentioning that the negative pulses for reversing the flip-flop circuit may also be fed directly to the base electrode of the transistor Q2.

The disclosed flip-flop circuit as well as its specifically described conversion into a one-shot circuit are only to be regarded as examples, and not as a limitation to the scope of this invention.

What is claimed is:

1. A pulse storage means comprising a plurality of tunnel diodes serially connected, each of said diodes having a first and a second voltage condition and each of said diodes changing from said first to said second voltage condition responsive to different values of current passing through said diodes, write-in means comprising bistable multivibrator means operated responsive to each of a plurality of input pulses for varying said current, one of said diodes changing from said first to said second voltage condition responsive to each input pulse thereby storing said input pulses, read-out means comprising means for converting said bistable multivibrator means to monostable multivibrator means and means responsive to said conversion for sequentially changing each of said diodes that are in said first voltage condition to its said second voltage condition.

2. The pulse storage means of claim 1 having means for resetting said diodes to said first voltage condition.

3. The pulse storage means of claim 1 wherein said means responsive to said conversion comprises means for increasing said current flow through said diode whereby said diode in said first voltage condition that is responsive to the lowest value of current changes to its said second voltage condition, means responsive to said voltage change for decreasing said current flow, timing means for automatically increasing said current flow after a predetermined time period to repeat said voltage condition change until all of said diodes are in said second voltage condition.

4. The pulse storage means of claim 1 wherein said bistable multivibrator means for varying said current increases said current responsive to each of said input pulses and means responsive to said voltage change caused by one of said diodes changing voltage conditions for decreasing said current.

5. The pulse storage means of claim 4 and inductor means for limiting the rate of change of said current.

6. The pulse storage means of claim 5 wherein said multivibrator is comprised of an input and an output transistor, said diodes being connected in series with said output transistor, said input transistor being normally conductive and said output transistor being normally blocked, means responsive to said input pulse for blocking said input transistor and unblocking said output transistor to increase the current through said diodes whereby one of said diodes changes from its first voltage condition to its second voltage condition, and means responsive to said voltage change for blocking said output transistor and unblocking said input transistor to decrease said current.

7. The pulse storage means of claim 6, and means for causing a bias current that is too small to change the voltage condition of said diodes to flow through said diodes while said output transistor is blocked.

8. The pulse storage means of claim 1 wherein each sequentially changing diode causes an output voltage pulse, and said output voltage pulses directly correspond to the complement of the number of stored pulses based on the number of pulses capable of being stored.

No references cited.

JOHN W. HUCKERT, *Primary Examiner.*

ARTHUR GAUSS, *Examiner.*